Jan. 4, 1927.
G. A. McALEAVEY
1,613,400
APPARATUS FOR TEACHING MUSIC
Filed Jan. 26, 1925    3 Sheets-Sheet 2
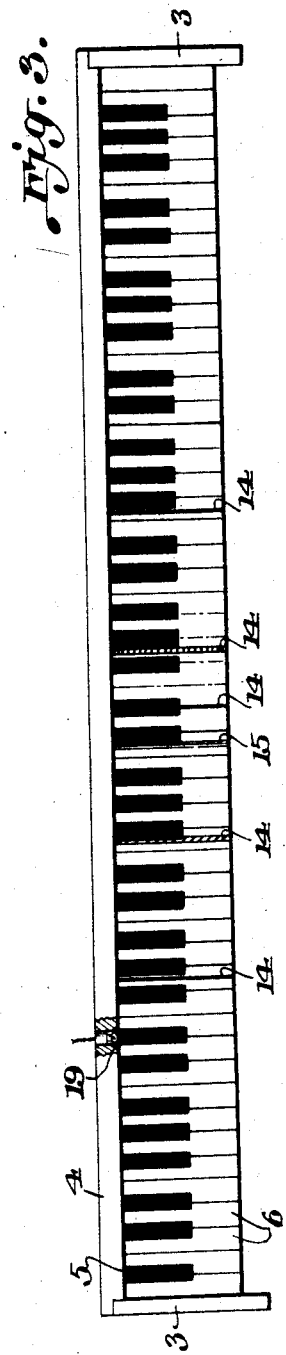
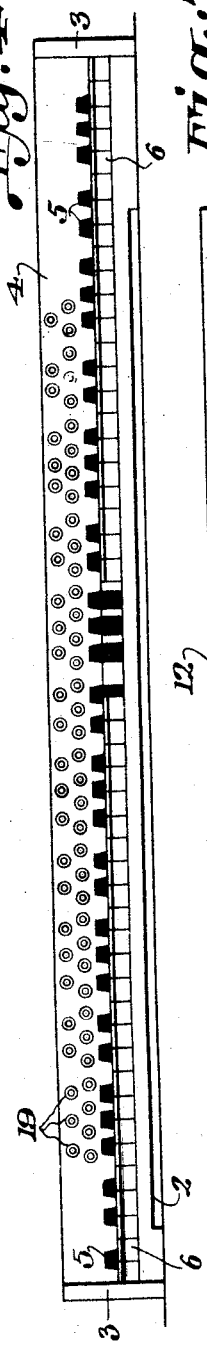
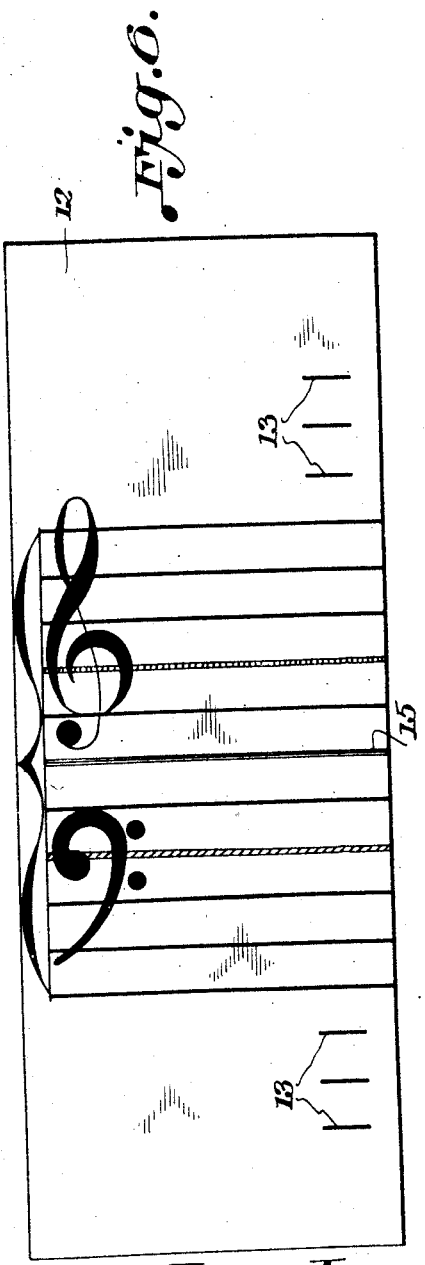
Inventor
G. A. McAleavey
by her Attorneys

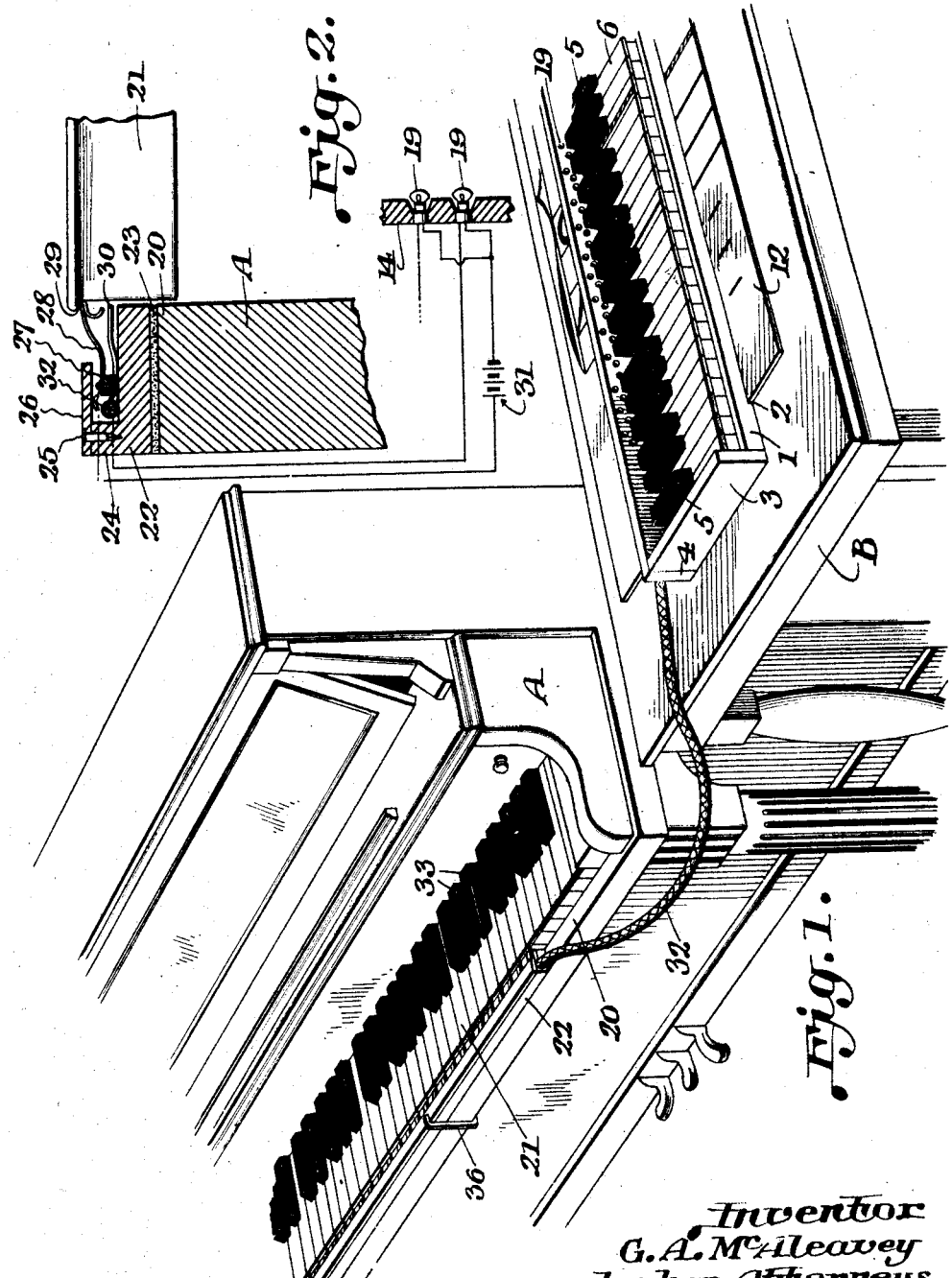

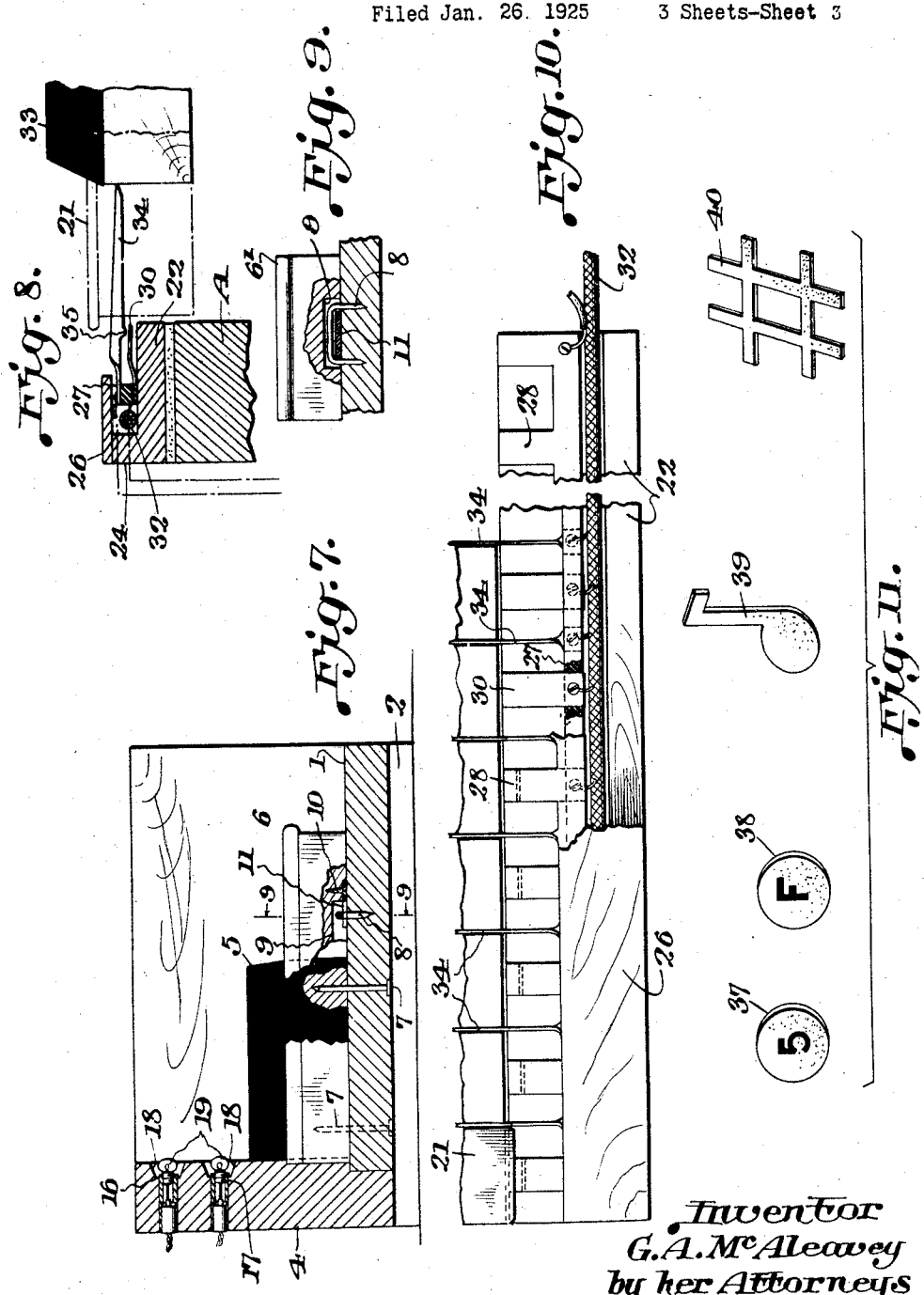

Patented Jan. 4, 1927.

1,613,400

UNITED STATES PATENT OFFICE.

GRACE ANN McALEAVEY, OF FOND DU LAC, WISCONSIN.

APPARATUS FOR TEACHING MUSIC.

Application filed January 26, 1925. Serial No. 4,787.

My invention relates to a method and apparatus for teaching music which is particularly adapted to young children and enables them to grasp the fundamentals readily and accurately. An object of the invention is to provide means whereby the notes or chords played by the instructor on the piano will be indicated by visual signals over a silent keyboard with which is associated a staff in proper relation to the keys. In this manner, the pupil sees exactly which keys are struck on the piano, sees exactly the position of these notes on the staff and their relation to the keyboard, and at the same time hears the music played.

Other objects of the invention will be apparent from the following detailed description and the appended claims.

In the drawings:

Figure 1 is a perspective view of a portion of a piano and a silent keyboard showing their relation.

Figure 2 shows a section through the piano keyboard and a section through the light supporting member of the silent keyboard, together with the circuits diagrammatically illustrated.

Figure 3 is a plan view of the silent keyboard with a part broken away to show the location of one of the lamps.

Figure 4 is a front elevation of the silent keyboard showing several white keys removed.

Figure 5 is an edge view of the staff board.

Figure 6 is a plan view of the staff board.

Figure 7 is a transverse section through the silent keyboard.

Figure 8 is a section similar to Figure 2, but showing the circuit closers for the black keys.

Figure 9 is a detail view on line 9—9 of Figure 7 showing the means for holding the removable keys in the silent keyboard.

Figure 10 is a plan view of the contacts on the piano with the parts broken away.

Figure 11 is a detail view of certain symbols employed in carrying out the process herein described.

There is herein illustrated a piano A having the usual keyboard and a table B for supporting the silent keyboard and its accessories. The silent keyboard comprises a base plate 1 having a cut out 2 in its lower side extending entirely from front to rear but being of lesser extent longitudinally. Upright end pieces 3 and an upright back piece 4 are fastened to the base 1 in any desired manner. Supported on the base 1 are keys forming a keyboard which corresponds to the piano keyboard, being composed of black and white keys arranged in the same order and of the same size. All of the black keys 5 and a number of the white keys 6 at each end of the keyboard are fixed to the base in any desired manner, as by nails 7 as shown in Figure 7. The white keys in the center of the keyboard are made removable for reasons hereinafter set forth.

Various means may be provided for removably mounting these white keys. As shown, staples 8 are driven into the base board leaving a space between the top of the staple and the board. Each white key has a cut out 9 in its lower side and to the bottom of the key adjacent the cut out is fastened by a screw 10 a tongue 11 which is adapted to slide between the top of the staple 8 and the base 1. The keys are thus held in position, but may be readily removed when desired.

A staff board 12 made of suitable material and shown in Figure 6 is ruled with the usual bass and treble staff and is adapted to slide or rest in the cut out 2 in the lower side of the base 1 so that the portions of the base at the sides of the staff board will rest evenly on the table or other support for the silent keyboard. This staff board is so positioned with regard to the keyboard that each line and space thereon lies under the white key which corresponds thereto. Certain lines 13 above and below the staff may be indicated as desired, and some of the lines 14 of the staff may be continued on the keys. The line 15 midway between the two staffs may be especially ruled as shown and also continued on the corresponding key. In this manner the pupil readily learns the precise keys which correspond to the different positions of the notes on the staff in the written music.

The back piece 4 is provided above the level of the keys with two horizontal rows of openings 16 and 17 which extend there-through. The upper row has openings lying over the black keys while the lower row of openings lies over the white keys. This arrangement might be reversed if desired. These openings have front flared ends 18 and are provided with sleeves or other appropriate means for holding small electric lamp bulbs 19 which lie within the flared ends of the openings and project slightly beyond the front face of the back piece 4. Each bulb is in a circuit which is closed by the depression of the corresponding key in the piano as hereinafter described. The bulbs may be of different colors if desired for special purposes.

Upon the ledge 20 of the piano immediately adjacent the front ends of the white keys 21 is supported a base member 22 extending the desired distance along the keyboard and provided with a felt or similar base 23. As shown in Figures 2 and 8, this has a cut out in its top which leaves a ledge 24 at the front side. To the top of this ledge is suitably fastened as by screws 25 a cover plate 26 which extends rearwardly toward the keys. On the base 22 is mounted a strip 27 of insulating material to which are attached a number of contact members 28 of spring material the rear ends of which just underlie the lip 29 on the front of each white key 21. A second contact member 30 underlies the first and when any key 21 is depressed the spring contact 28 is moved downward into engagement with the contact member 30, thus closing the circuit through the battery 31 to the proper electric bulb 19 over the silent keyboard. In this manner the depression of any white key of the piano will light the bulb over the corresponding white key in the silent keyboard. All of the wires for the different circuits are wrapped in a cable 32.

Since the black keys 33 do not extend to the front of the keyboard, different means must be adopted for closing the circuit when these are actuated. One of the possible means of obtaining this result is shown in Figure 8. The general arrangement is the same, but special circuit closers 34 of thin strips arranged vertically and having sharpened rear ends are provided. The strips slide freely between the white keys 21 and their rear sharpened ends are pressed into contact with the black keys 33 at a point below the tops of the white keys. Each strip 34 has a projection 35 on its lower side to engage the contact strip 30 when a black key is depressed.

Obviously other means could be provided for closing the proper circuit upon the depression of the piano keys, but the foregoing is a simple and efficient embodiment of this portion of the invention. All of the contact members are carried by the base 22 and can be removed as a unit and quickly applied to another piano. If desired or necessary a clamp 36 may be provided for holding this unit in fixed position on the piano. Instead of a battery, any desired source of electric current may be employed with suitable transformer if necessary.

Figure 11 shows various devices which are employed with my method of teaching music and may be placed on the staff board to illustrate certain symbols. These are merely illustrative and include a number disc 37, a letter disc 38, a note 39 and the symbol 40 for sharps. These and as many others as desired can be placed in proper relation to the staff board to indicate the desired musical characteristics.

In carrying out my method of teaching music, the teacher strikes a note, chord or scale on the piano. The pupil is seated at the silent keyboard and as each note is played by the piano, the corresponding electric light is lighted over the silent keyboard. This shows the pupil exactly what key has been played, and also exactly what the position on the staff of that note is. If desired, the music being played may also be supported in front of the pupil by a suitable rack back of the silent keyboard. In this manner the eye and the ear cooperate to fix the note and its corresponding relation on the keyboard and musical staff in the mind of the pupil.

It is obvious that various detail changes can be made in the particular structure disclosed for carrying out the method without in any way departing from the spirit of the invention which is to be regarded as limited only by the scope of the appended claims.

I claim as my invention:

1. Apparatus for teaching music comprising a piano keyboard, a silent keyboard, a staff board located in proper relation to the silent keyboard, and means operated by a depression of a key in the piano keyboard for displaying a visual signal adjacent the corresponding key in the silent keyboard.

2. Apparatus for teaching music comprising a piano keyboard, a silent keyboard, a staff board located beneath the silent keyboard in position that the keys are in alignment with the lines of the staff corresponding thereto, and means operated by a depression of a key in the piano keyboard for displaying a visual signal adjacent the corresponding key in the silent keyboard.

3. Apparatus for teaching music comprising a piano keyboard, a silent keyboard, a staff board located in proper relation thereto, and means operated by a depression of a key in the piano keyboard for lighting an electric light adjacent the corresponding key in the silent keyboard.

4. In apparatus for teaching music, a silent keyboard comprising a base, a removable key therefor, and means for retaining said keys in position including a retaining member carried by the base and a tongue carried by the key and moving into engagement with the retaining member by sliding the key into position.

5. In apparatus for teaching music, a silent keyboard comprising a base, a removable key having a cut out therein, a tongue in said cut out and a retainer carried by said base and engaged by the tongue when the key is slid into position.

In testimony whereof, I have hereunto subscribed my name.

GRACE ANN McALEAVEY.